US011899480B2

(12) United States Patent
Tse et al.

(10) Patent No.: US 11,899,480 B2
(45) Date of Patent: Feb. 13, 2024

(54) VOLTAGE REGULATOR WITH ENHANCED TRANSIENT REGULATION AND LOW-POWER SUB REGULATOR

(71) Applicant: Analog Devices, Inc., Wilmington, MA (US)

(72) Inventors: Colin Tse, Wilmington, MA (US); James Lin, Reading, MA (US)

(73) Assignee: Analog Devices, Inc., Wilmington, MA (US)

(*) Notice: Subject to any disclaimer, the term of this patent is extended or adjusted under 35 U.S.C. 154(b) by 75 days.

(21) Appl. No.: 17/827,145

(22) Filed: May 27, 2022

(65) Prior Publication Data

US 2022/0382307 A1 Dec. 1, 2022

Related U.S. Application Data

(60) Provisional application No. 63/194,028, filed on May 27, 2021.

(51) Int. Cl.

| | |
|---|---|
| ***G05F 1/56*** | (2006.01) |
| ***G05F 1/565*** | (2006.01) |
| ***G05F 1/575*** | (2006.01) |
| ***G05F 1/46*** | (2006.01) |

(52) U.S. Cl.
CPC .............. *G05F 1/565* (2013.01); *G05F 1/468* (2013.01); *G05F 1/575* (2013.01)

(58) Field of Classification Search
CPC ........... G05F 1/468; G05F 1/565; G05F 1/575
See application file for complete search history.

(56) References Cited

U.S. PATENT DOCUMENTS

| | | | |
|---|---|---|---|
| 6,175,223 B1 | 1/2001 | Martinez et al. | |
| 6,969,977 B1 | 11/2005 | Smith | |
| 7,064,531 B1 | 6/2006 | Zinn | |
| 7,397,226 B1 | 7/2008 | Mannama et al. | |
| 8,018,214 B2 | 9/2011 | Kwon et al. | |
| 8,975,776 B2 | 3/2015 | Gunther et al. | |
| 2007/0108950 A1* | 5/2007 | Kakinuma | G05F 1/565 323/280 |
| 2018/0120875 A1* | 5/2018 | Suzuki | H03K 17/08 |
| 2021/0064071 A1* | 3/2021 | Kadowaki | H03F 3/45475 |
| 2022/0137655 A1* | 5/2022 | Ray | G05F 1/565 323/282 |

* cited by examiner

*Primary Examiner* — Jue Zhang
*Assistant Examiner* — Lakaisha Jackson
(74) *Attorney, Agent, or Firm* — Schwegman Lundberg & Woessner, P.A.

(57) ABSTRACT

A voltage regulator circuit can include two feedback loops, such as to reduce or suppress an unwanted transient condition in an output voltage during transient conditions such as during startup or during load current demand transients. One of the two feedback loops can include a shunt device arranged to provide a temporary current pathway during the transient condition to change current provided to a load connected to an output of the voltage regulation circuit. In addition, or instead, the voltage regulator circuit can include an open-loop regulation circuit separate from a loop corresponding to the first error amplifier. The open-loop regulator circuit can operate in a lower-power mode as compared to a closed-loop regulator circuit. A portion or an entirety of the voltage regulator circuit can be implemented in an integrated circuit, such as monolithically.

21 Claims, 6 Drawing Sheets

VOLTAGE REGULATOR WITH ENHANCED TRANSIENT REGULATION AND LOW-POWER SUB REGULATOR

CLAIM OF PRIORITY

This application claims priority to U.S. Provisional Application Ser. No. 63/194,028, filed May 27, 2021, which is incorporated by reference herein in its entirety.

BACKGROUND

Regulator circuits are used to provide a regulated voltage to other circuits that are sensitive to variations in bias voltage or supply voltage. A regulator circuit can provide a constant voltage at its output to supply power to voltage sensitive circuitry regardless of changes to its input supply voltage or the load current. In some types of regulator circuits, voltage overshoot and undershoot events can happen at the regulator circuit output during startup due to startup transient conditions. Overshoot and undershoot events are disturbances that may cause an unregulated voltage to be provided to the sensitive circuitry. Overshoot and undershoot events can occur with applications having a dynamic load current, where sudden changes in load current may cause transients at the regulator circuit. These types of disturbances are less of an issue in higher current applications because higher load current can more easily bring the regulator circuit back to its nominal state. However, recovery from overshoot and undershoot events in low power applications may take significantly longer because the load current available to bring the circuit back to its nominal state is small. It is desirable for low power regulator circuits to be robust to transient events.

OVERVIEW

This document pertains generally, but not by way of limitation, to voltage regulation circuitry, and more particularly, to voltage regulation circuitry having two or more regulation feedback loops, or supporting a lower-power consumption (e.g., "standby") mode using a separate regulator circuit, or a combination of these aspects.

Transient overshoot or undershoot can be difficult to address on startup of a linear voltage regulator. Use of a secondary circuit loop (e.g., having lower latency in the response or a greater bandwidth than the primary or main regulator circuit loop) can suppress a voltage overshoot transient at a regulator output, such as during startup or during a transition between modes of an integrated circuit. This approach can be used for so-called ultra-low power (e.g., microwatt-scale) applications, such as where there are low supply currents (e.g., less than one microampere) corresponding to a relatively high load impedance. Applications with these conditions may result in slow settling, particularly if there is voltage overshoot in the regulator output voltage during startup. A similar approach can be used for suppressing overshoot or undershoot events, that may occur with sudden changes in load current and cause transients in the regulator output voltage.

In one approach, a voltage reference can be used that sums contributions from Complementary-to-Absolute Temperature (CTAT) and Proportional-to-Absolute-Temperature (PTAT) references (e.g., "CTAT+PTAT") to create a reference voltage. In another approach, either in combination with the dual-loop regulation approach mentioned above, or separately, a difference between two CTAT-derived voltages can be used (e.g., "CTAT minus CTAT" or "CTAT-CTAT") to provide a regulated output voltage having reduced temperature dependence. A PTAT-PTAT reference can also be used. The CTAT-CTAT reference can be implemented in part using a field effect transistor (FET) gate-to-source voltage (e.g., Vgs), which can allow for a simple and low power implementation of at least a portion of the reference circuit. Use of a CTAT-CTAT or PTAT-PTAT reference topology can allow for better matching between devices, because two CTAT-derived reference voltages or two PTAT-derived reference voltages can be created out of similar or even the same types of devices.

In yet another approach, a main regulator loop can be disabled, such as in a standby mode. In the standby mode, a regulator circuit output can be forced or driven using a low-power, open-loop, temperature compensated circuit. This allows for dynamic power consumption even in a standby mode of operation and can allow for extremely low power operation by removing excess currents used to bias or operate the main regulator loop in normal operation. For example, the main regulator loop, biasing, and related circuitry can be disabled in the standby mode. The low-power open-loop output can be generated using a CTAT-CTAT approach or PTAT-PTAT approach as mentioned above.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
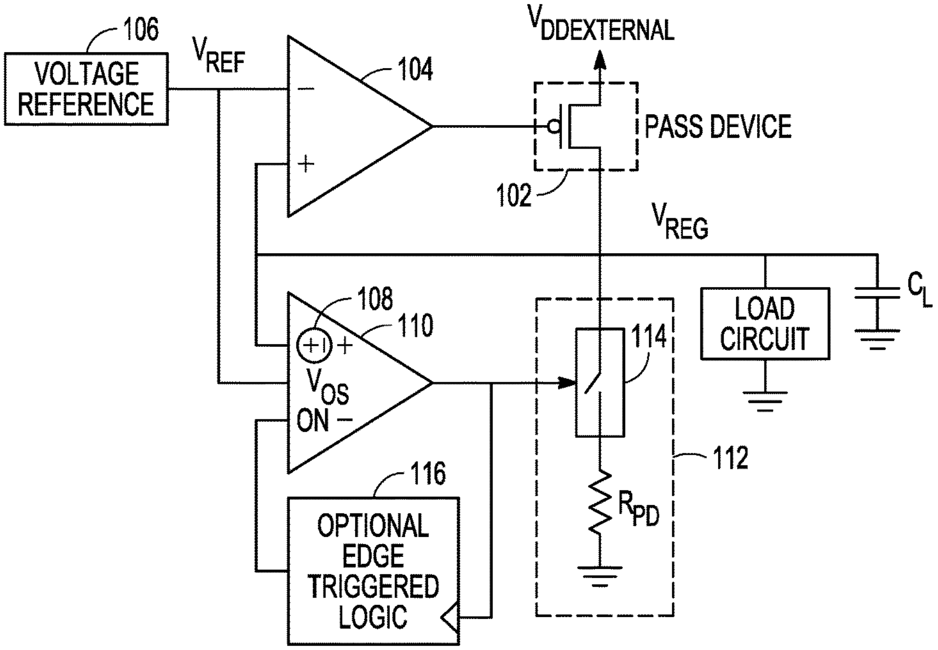
FIG. 1A is a circuit diagram of an example of a regulator circuit having a two-loop regulator circuit topology.

A linear regulator circuit topology can include an error amplifier coupled to a pass device to form a main feedback circuit loop. In this single-loop approach, voltage overshoot events can occur at the regulator circuit output node during startup, as well as in response to dynamic (e.g., changing) load current demand. These events can happen either due to startup transient conditions or due to a load circuit temporarily sourcing currents, as illustrative examples. This may be less of a concern in relatively higher-current applications, because load currents are much larger and can more easily pull down the output node to the target regulated output voltage.

In an Application Specific Integrated Circuit (ASIC) with multiple operation modes, the pass device of the main regulator circuit loop is generally sized for the largest currents to be supplied by the regulator circuit. If the ASIC starts up in a relatively lower-current consumption mode, a large pass device can source a large amount of charge before the loop can react, causing voltage overshoot. In a low-power context, the load current supplied by the regulator is small, so any discharging of the output node to bring the regulator back to its nominal state can take significantly longer due to a relatively higher load impedance as compared to a relatively higher-current application. An ultra-low power application (e.g., microwatt range) may have no additional feedback structure and may use unity gain feedback from the regulator output because additional feedback will likely cost extra power to run. In the ultra-low power scenario, the load circuit current may be supplying the only biasing for the regulator pass device, resulting in an extended settling time from a voltage-overshoot scenario.

To address unwanted overshoot, an aspect of the present subject matter can include circuitry to remove charge quickly and speed up the discharging of the output node through a resistor or through load to ground (or another node such as a negative supply node). This circuitry can be included in a secondary circuit loop that operates much faster (e.g., with lower latency or greater bandwidth) than the main regulator loop and corrects for overshoot. This allows for much quicker settling time compared to waiting for a slow discharge through the load circuit and the main regulator loop.

Further, in a low power application, very low power modes such as a standby or sleep mode can be supported. The normal operating currents drawn by a regulator circuit can be too large for these modes, so the present subject matter can address this challenge by making use of an open-loop low-power sub-regulator, which controls the output-regulated node in place of the main regulator loop. This allows complete shut off of the typical currents drawn in the main regulator, as the specifications and related operating constraints for a regulator in a standby mode will typically be much less stringent than in a normal operating mode with the main regulator active. Aside from a reference voltage, no extra amplifier or active current is required to provide an open-loop sub-regulator.

FIG. 1A is a circuit diagram of an example of a regulator circuit having a two-loop regulator circuit topology including a main regulator circuit loop and a secondary circuit loop. The main regulator loop includes a pass device 102, a feedback network and an error amplifier 104. In the example of FIG. 1A, the pass device 102 is an FET. In some examples, the pass device can be a P-type FET or N-type FET or a combination of these devices. The feedback network may be a unity gain feedback scheme. The error amplifier 104 has an input connected to the output of the feedback network and an inverting input connected to a voltage reference 106, $V_{REF}$, that may be implemented as a bandgap reference circuit for example. This two-loop regulator topology can provide a "low-dropout" topology (e.g., LDO) that generates a regulated output voltage VREG at the output node. The error amplifier 104 can drive the pass device 102 so that the output voltage is driven to match the reference $V_{REF}$ (or a representation thereof such as a scaled representation of $V_{REF}$). The two-loop regulator topology can also provide some supply rejection if the input supply has noise ripple.

The secondary loop includes a feedback network, a voltage offset generator 108 that generates offset voltage $V_{OS}$, a second error amplifier 110 or comparator, and a shunt device 112. The shunt device 112 has a shunt input that is connectable to ground using a control gate 114 controlled by the second error amplifier 110. The shunt device 112 can be implemented using a transistor such as an NMOS FET or PMOS FET, or a combination of such devices. To keep the circuit simple as is desirable in an ultra-low power application, the inputs to the second error amplifier or comparator can be the same as the inputs to the first error amplifier 104 of the main regulator loop. This means the secondary loop needs no additional circuitry aside from the above, which results in no additional current.

Figure 1B:
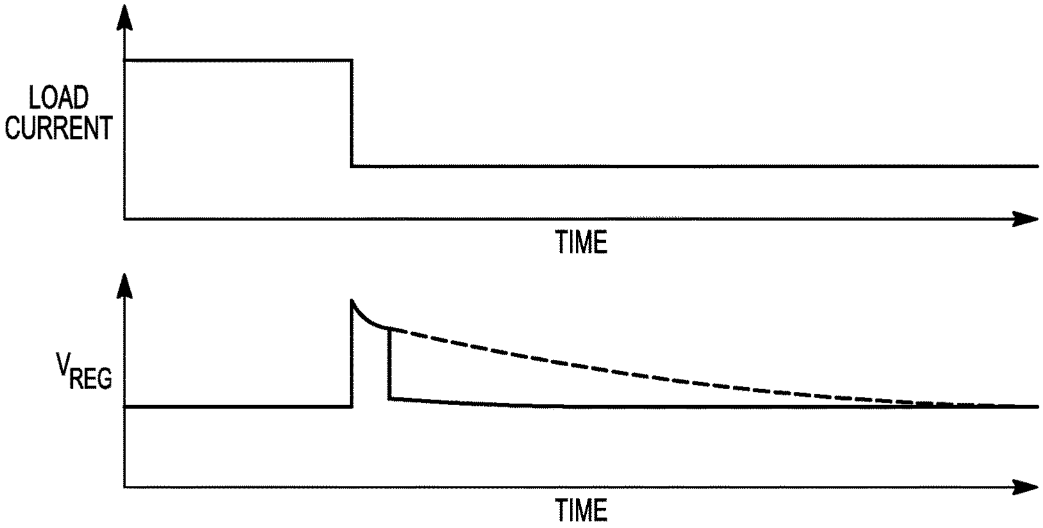
FIG. 1B is an illustration of waveforms showing operation of the circuit in FIG. 1A.

The secondary loop acts to remove current from the output voltage node when the output voltage overshoots a target VREG output voltage. The secondary loop has high gain to give it a much faster response than the main regulator loop. This is illustrated by the waveforms in FIG. 1B. Without the secondary loop, the overshoot would correct slowly, and the output would follow the waveform of the dotted line of the VREG waveform. Because of the quick response time of the secondary loop, charge is quickly shunted away from the load, resulting in the short pulse shown in the VREG waveform. The duration of the pulse depends on the speed, hysteresis, and latency of the second error amplifier 110 or comparator.

When the secondary loop is not needed in an example, a falling edge of the output of the error amplifier 110 or comparator can be used as a signal to permanently turn off the secondary loop if desired. The regulator circuit can include edge triggered logic circuitry 116 to detect the falling edge. In this case, there is no additional added current whatsoever associated with the presence of the secondary loop, aside from during the startup duration and from leakage. This means that low power consumption is maintained during normal operation.

The voltage offset circuit 108 can provide hysteresis in operation of the secondary loop. The hysteresis ensures that no current is pulled out of VREG while the main pass device 102 is supplying load current (e.g., suppressing shoot-through). This prevents a condition that could cause significant through current between the pass device 102 and the shunt device 112. The offset voltage $V_{OS}$ can be generated with a circuit that consumes virtually no power. Some examples of voltage offset circuit 108 include an unmatched FET differential pair, or a simple switched-capacitor voltage generator that acts on a single clock edge.

The shunt input of the shunt device 112 is coupled to the output of the regulator circuit, and a control gate 114 of the shunt device is coupled to the secondary loop error amplifier 110. When the output voltage VREG exceeds the reference voltage $V_{REF}$ plus the offset voltage $V_{OS}$ due to a transient event for example, the secondary loop triggers. The high gain in the secondary loop error amplifier 110 or comparator causes the error amplifier output to move high in a quick response to the control gate 114 of the shunt device 112, which allows for a fast removal of charge. When VREG reaches a value below the reference voltage plus the offset voltage, the error amplifier senses this, and its output falls from high to low, turning off the shunt device 112. Because of the hysteresis, current is still drawn out from the output node by the load circuit because the upper loop is off, so the output of the secondary loop error amplifier 110 will drop to a low state. This amplifier output event falling from high to low can be captured in a flip flop (e.g., using edge triggered logic 116) to disable the secondary loop until the circuit starts up (e.g., a reset state) or the mode transitions again if desired. The polarity or sign of the signals mentioned above is merely illustrative.

Figure 2:
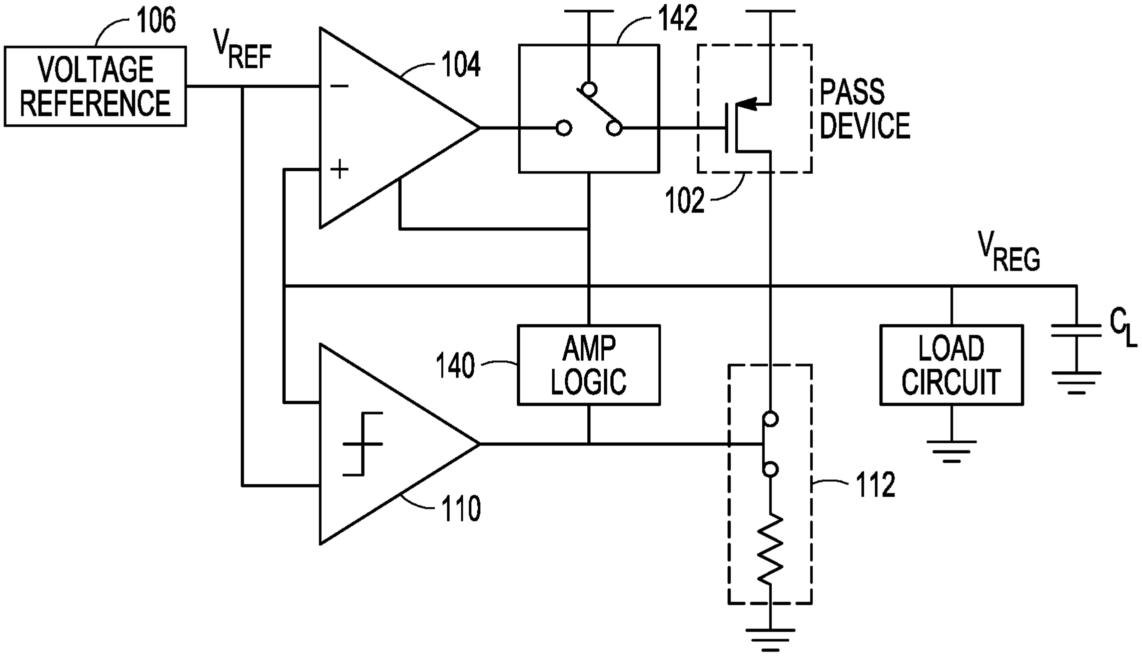
FIG. 2 is a circuit schematic of another example of a regulator circuit having a two-loop regulator circuit topology.

FIG. 2 is a circuit diagram of another example of a regulator circuit having a two-loop regulator circuit topology. As in the example of FIG. 1A, the secondary loop acts to remove current from the output voltage node when the output voltage overshoots a target VREG output voltage. The regulator circuit of FIG. 2 includes logic circuitry 140 to detect when the second error amplifier 110 or comparator becomes active due to overshoot. When the second error amplifier 110 or comparator becomes active the logic circuitry 140 turns off the main regulator loop. The main regulator loop is turned off by disabling one or both of the first error amplifier 104 and the pass device 102. Switch 142 may be opened by the logic circuitry 140 to disable the pass device.

Figure 3A:
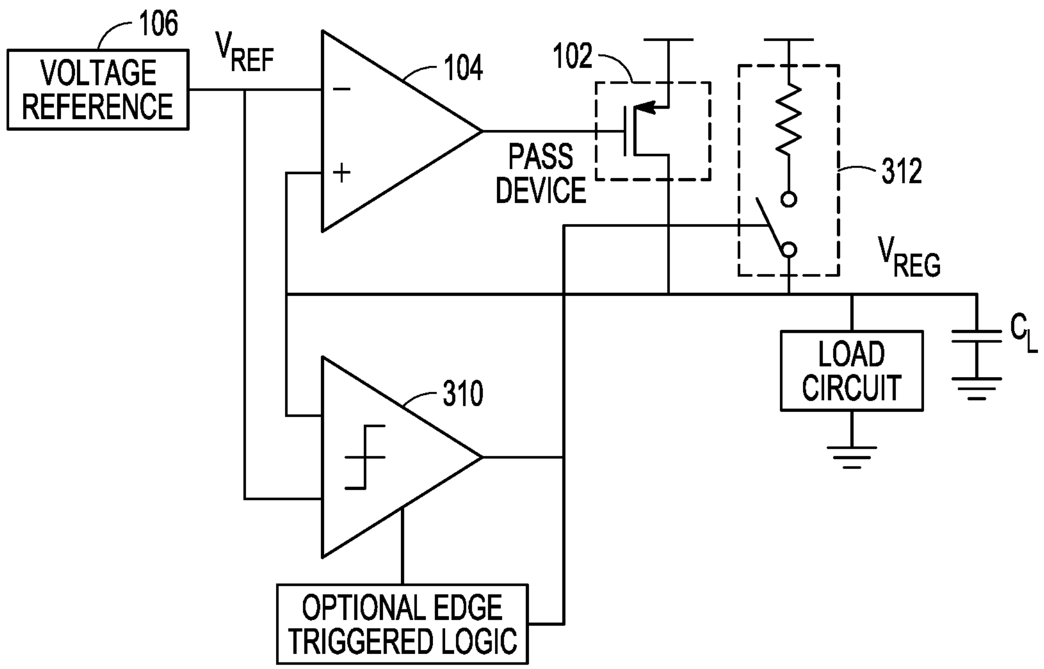
FIG. 3A is a circuit schematic of still another example of a regulator circuit having a two-loop regulator circuit topology.

FIG. 3A is a circuit diagram of another example of a regulator circuit having a two-loop regulator circuit topology. The regulator circuit of FIG. 3A differs from the examples of FIGS. 1A and 2 in that it includes circuitry to handle transient events that causes undershoot. In this example, the regulator circuit includes a shunt device 212 between the supply rail and the load. When the second error amplifier 110 or comparator detects undershoot of the output voltage, the shunt device 212 is enabled to suppress the undershoot by boosting current to the output of the voltage regulation circuit. As in the example of FIG. 1A, secondary loop has high gain to give it a much faster response than the main regulator loop.

Figure 3B:
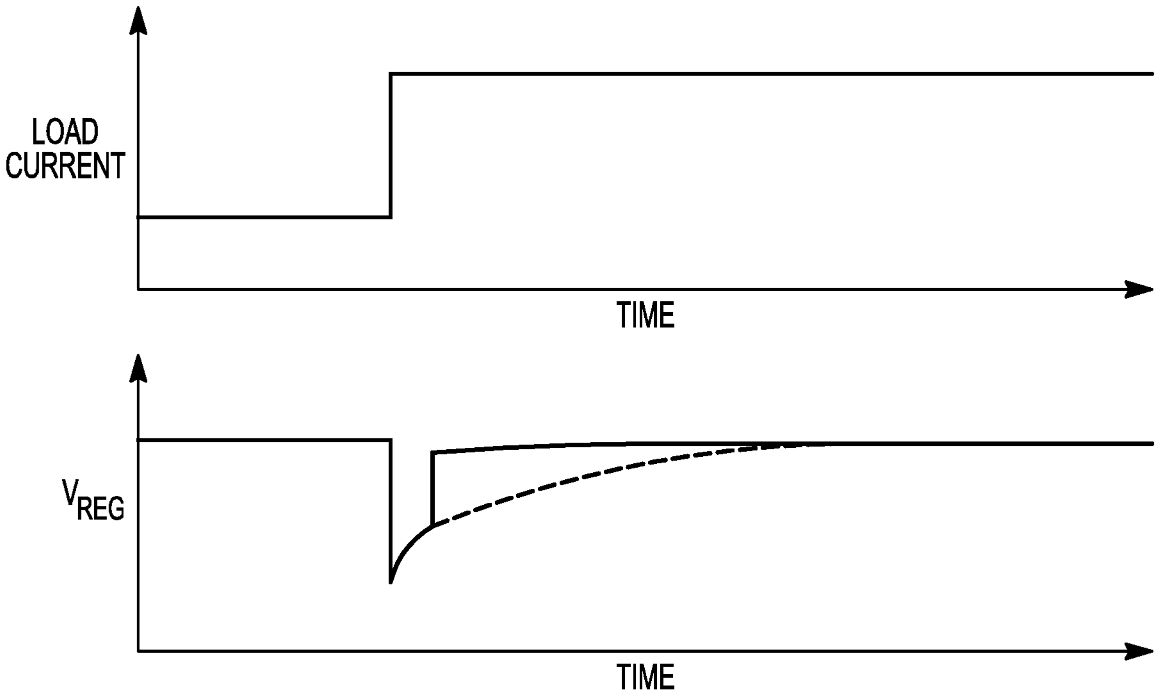
FIG. 3B is an illustration of waveforms showing operation of the circuit in FIG. 3A.

This is illustrated by the waveforms in FIG. 3B. Without the secondary loop, the overshoot would correct slowly, and the output would follow the waveform of the dotted line of the VREG waveform. Because of the quick response time of the secondary loop, current is quickly provided to the load by the supplemental current path of the shunt device 212, resulting in the short pulse shown in the VREG waveform. The duration of the pulse depends on the speed of the second error amplifier 110 or comparator.

The regulator circuits of FIGS. 1A, 2, and 3A may include both shunt devices (112, 312) with control circuitry to either bypass load current away from the circuit load when a transient causes overshoot as in the example of FIG. 1A, or source current to the load when a transient causes under shoot as in the example of FIG. 3A.

In a low power application, it may be desirable to support very low power modes such as a standby or sleep mode. However, the normal operating currents drawn by a regulator circuit can be too large for these low power modes. An approach to implementing a very low power mode in a regulator circuit is to include an open-loop low-power sub-regulator, which controls the output-regulated node in place of the main regulator loop in the very low power modes.

Figure 4:
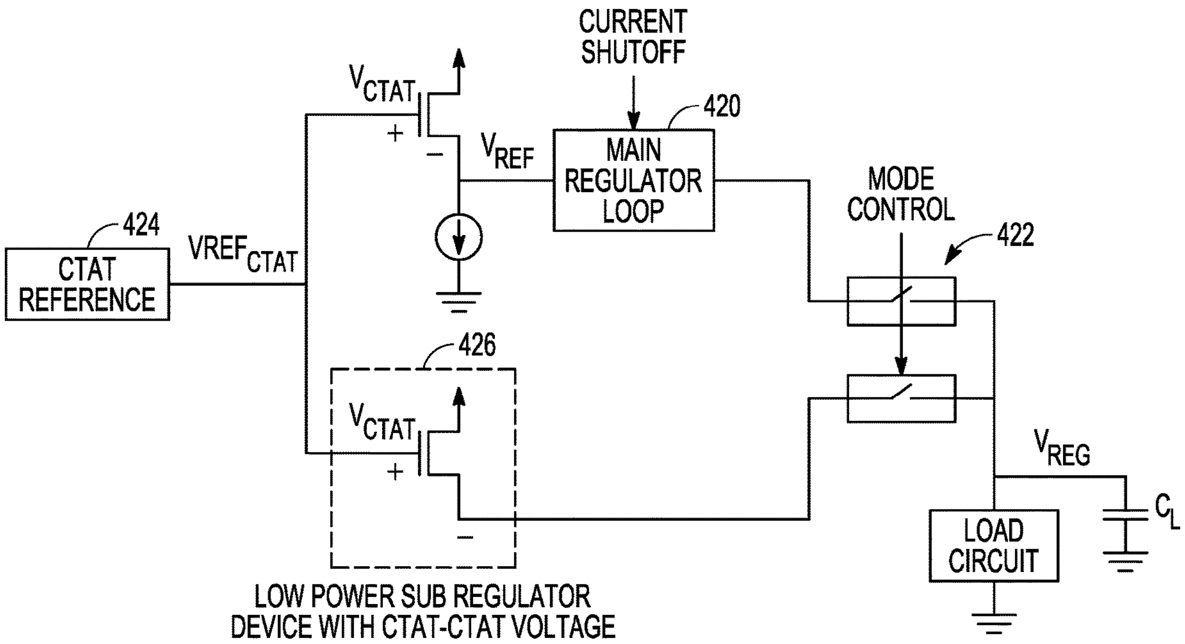
FIG. 4 is a circuit schematic of an example of a regulator circuit that adds an open-loop regulator circuit topology to a main regulator loop.

FIG. 4 is a circuit schematic of another example of a regulator circuit. The regulator has an open-loop regulation circuit separate from the main regulator loop corresponding to the first error amplifier and the secondary loop corresponding to the second error amplifier. The open-loop regulation circuit includes an open-loop low-power sub-regulator 426, which controls the output-regulated node in place of the main regulator loop in the very low power mode. This allows complete shut off of the typical currents drawn in the main regulator loop 420. For the open loop regulation, the source terminal of the nmos device decreases when the load current increases. This causes the nmos device to source more current which helps stabilize the output node when the load current changes.

The main regulator loop 420 can include either a single-loop regulator topology or a two-loop regulator topology as in the examples of FIGS. 1A, 2, and 3A. The main regulator loop 420 can be disabled (e.g., by removing the drive current), and operation can be switched over to the open-loop sub regulator if lower output current in a very low power mode is desired. The open-loop regulation circuit is limited to supplying an output current that is substantially less than a corresponding maximum output current supplied through a pass device such as the pass device 102 of FIG. 1A. The regulator circuit in FIG. 4 may include a selectable mode input 422 or mode control input to selectively enable or disable mode controlled switches. The first error amplifier and second error amplifier of the main regulator loop are configured to be enabled or disabled in response to the mode input. The open-loop regulation circuit is selectively enabled in the mode where the first error amplifier and second error amplifier are disabled.

Switching the regulation to the open loop sub-regulator is possible because the specifications and related operating constraints for a regulator in a standby mode will typically be much less stringent than in a normal operating mode with the main regulator loop active. The open-loop sub-regulator 426 includes an input coupled to the voltage reference 424 and an output that provides a substantially constant voltage generated at least in part using the voltage reference 424. Aside from the reference voltage ($V_{REFCTAT}$), no extra amplifier or active current is required to for the open-loop sub-regulator.

In the example of FIG. 4, the voltage reference circuit 424 has a Complementary-to-Absolute-Temperature (CTAT) topology and the open loop sub-regulator 426 in FIG. 4 has a CTAT-CTAT topology having a CTAT temperature response. The reference voltage $V_{REFCTAT}$ can be a CTAT voltage generated by a current running through NMOS FET-implemented diodes to create a gate-to-source voltage (Vgs) voltage. This CTAT temperature response can be tuned to a desired temperature coefficient by either tuning the width-to-length ratio (W/L) of the transistor devices, or by adjusting a temperature coefficient or W/L of a current source.

Figure 5:
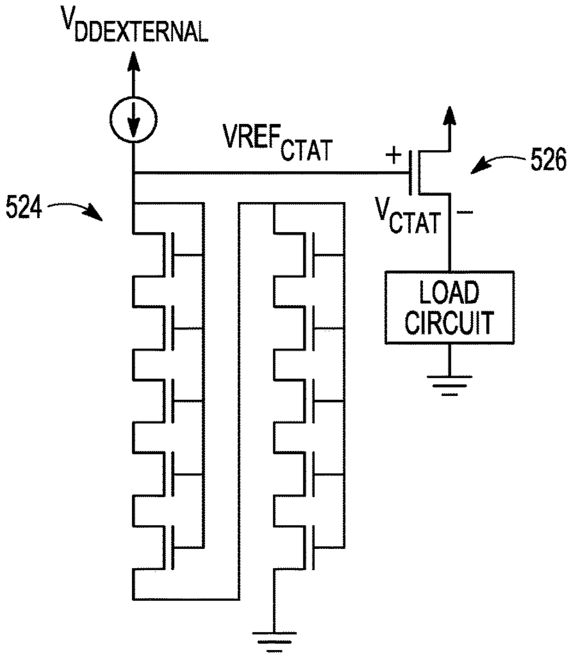
FIG. 5 is a circuit schematic of an example of a low power open-loop regulation circuit.

FIG. 5 is a circuit schematic of an example of a circuit to provide an open-loop CTAT-CTAT regulator topology to a load circuit. The open-loop regulation circuit is implemented using NMOS FET devices and includes a CTAT voltage reference 524 and a low power sub-regulator device 526 having a CTAT temperature response for the reference voltage. The CTAT-CTAT topology allows for a subtraction of an NMOS device Vgs-contribution from the output of the reference circuit 524. Accordingly, the CTAT reference circuit 524 coupled to the sub-regulator device 526 having a CTAT temperature response provides a CTAT-CTAT temperature response, effectively canceling or suppressing temperature dependence.

The CTAT voltage reference 524 can be powered by a nano-ampere (nA) scale leakage current, such as supplied by around 6 nA. A one-volt (1V) output of an open-loop regulator (such as supplying 100 nA of output current or less) can be operated using about 10 nA or less (not including the output current).

Figure 6:
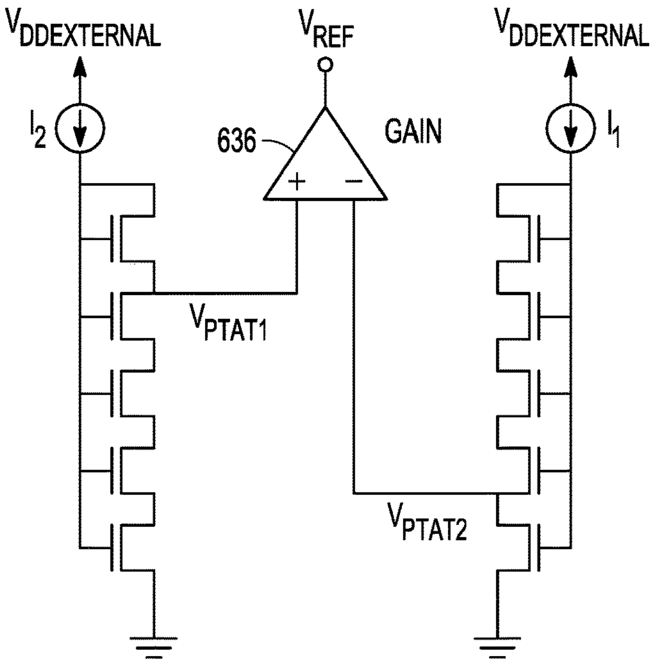
FIGS. 6-7 are circuit schematics of additional examples of a low power open-loop regulation circuit.
Figure 7:
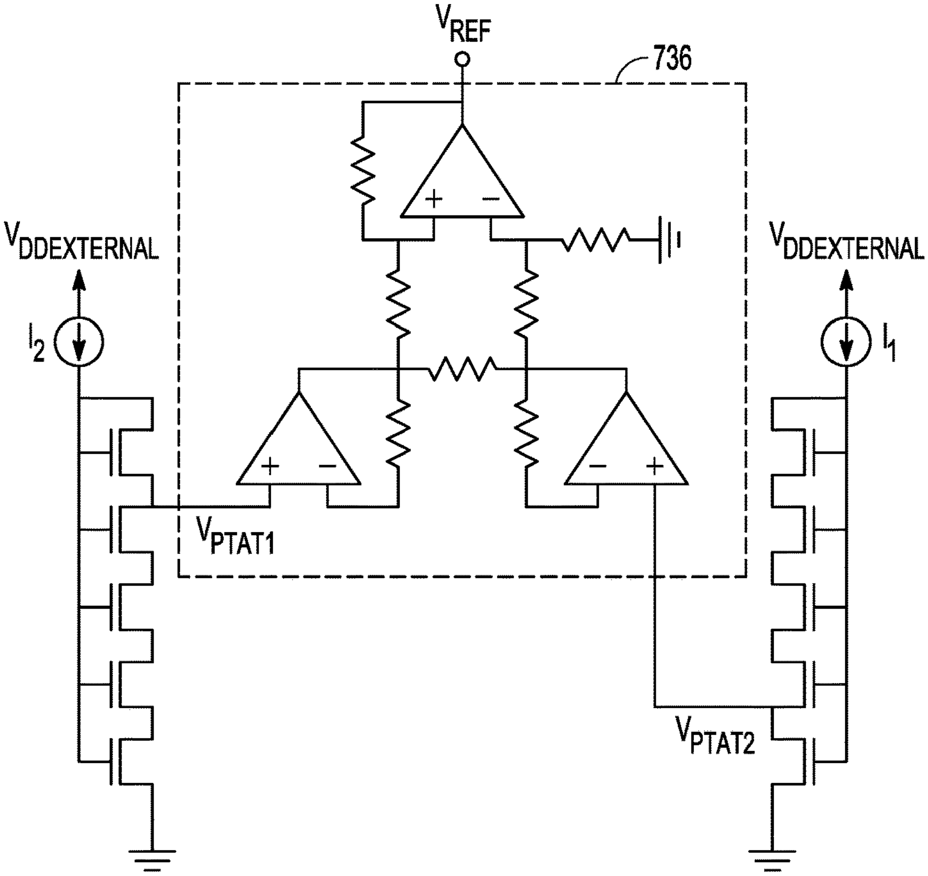

In some examples, the open loop regulator of FIG. 4 has a PTAT-PTAT topology. FIG. 6 is circuit schematic of an example of an open loop PTAT-PTAT regulator circuit. The open loop regulator provides a $PTAT_1$-$PTAT_2$ temperature response, effectively canceling or suppressing temperature dependence. FIG. 7 is a circuit schematic of another example of an open loop PTAT-PTAT regulator circuit. In the example of FIG. 7, the gain stage 636 of FIG. 6 is implemented using an instrumentation amplifier 736.

Figure 8:
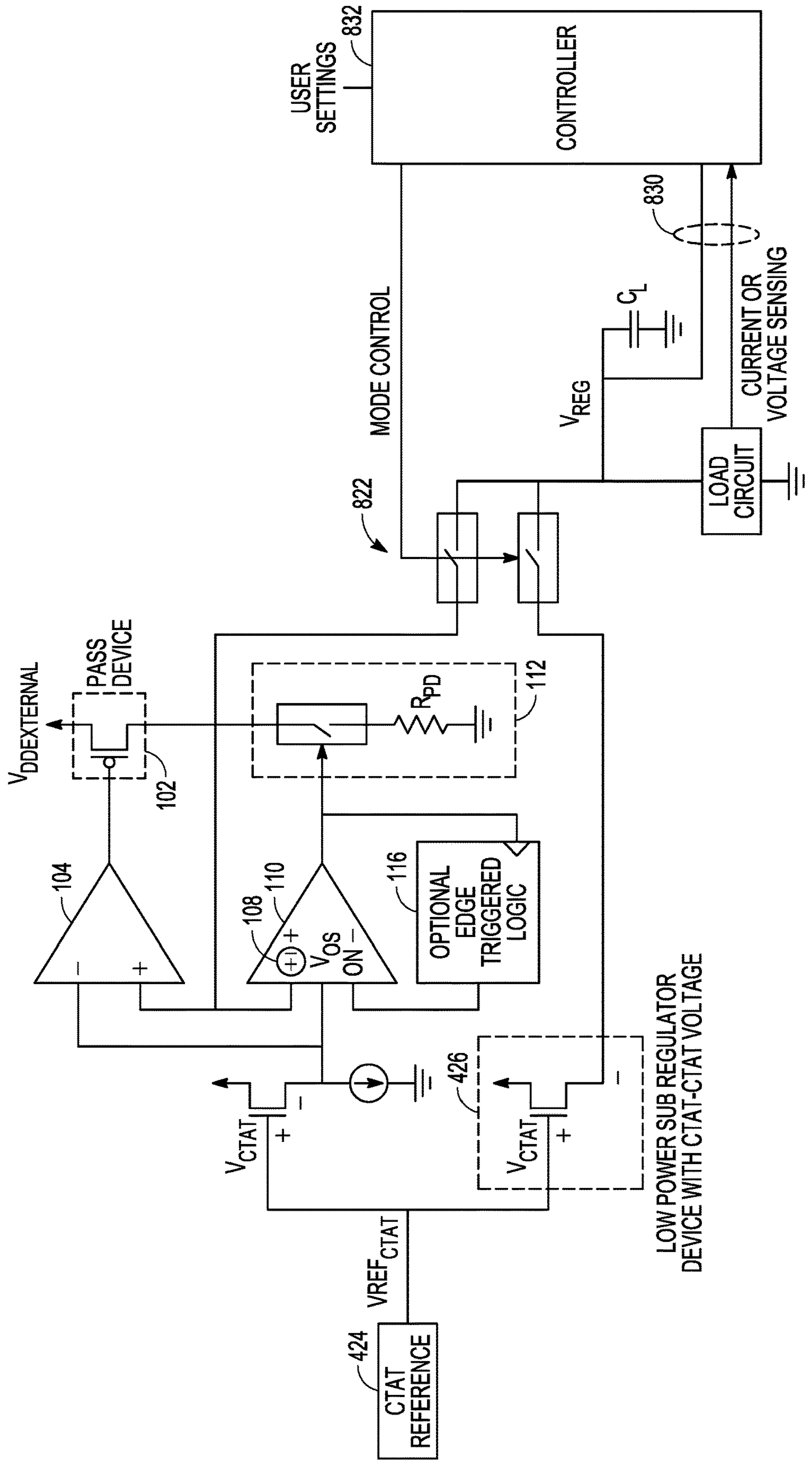
FIG. 8 is a circuit schematic of a further example of a regulator circuit.

FIG. 8 is a circuit schematic of another example of a regulator circuit. The regulator circuit has a two-loop regulator topology and also includes an open-loop CTAT-CTAT regulator topology for very low power. In variations, the regulator circuit includes an open-loop PTAT-PTAT regulator topology. The mode input control signal to switch between operation of the main regulator loop and the open-loop sub-regulator may or may not be externally generated. In the example of FIG. 8, the regulator circuit automatically switches between two-loop regulation and the very low power open loop regulation using automatic mode control input 822. In other examples, the mode input control can be generated externally as user settings.

Load current (or load voltage) 830 may be sensed and the sensed signal is provided to a control circuit 832. If the sensed load current falls below a specified threshold, the control circuit 832 can switch the operating mode to the open-loop regulator to save power. Similarly, if the output current demand increases the load current above the same or a different specified threshold, the control circuit 832 can switch the operating mode to enable a closed loop state that can handle a larger load (e.g., using the main regulator loop). This allows for dynamic switching between open-loop and closed-loop states. The regulator circuit may be used to provide a regulated voltage to at least a portion of an electronic system. The electronic system may include an inertial sensor such as an integrated accelerometer.

The devices, systems and methods described herein provide techniques that provide a regulated output that reduces or suppresses output transients. A very low power mode that regulates the output in a sleep mode or shutdown mode is also provided.

ADDITIONAL DESCRIPTION AND ASPECTS

Aspect 1 includes subject matter (such as a voltage regulator circuit) including a reference input to receive a reference voltage; a first error amplifier coupled to the reference input, the first error amplifier comprising an output indicative of a first difference between a representation of the reference voltage received from the reference input, and a representation of an output voltage of the voltage regulation circuit; a pass device coupled to the output of the first error amplifier, the pass device arranged to supply an output of the voltage regulation circuit; a second error amplifier coupled to the reference input, the second error amplifier comprising an output indicative of another difference between a representation of the reference voltage received from the reference input, and another representation of the output voltage of the voltage regulation circuit; a shunt device coupled to the output of the second error amplifier, the shunt device arranged to provide a temporary current pathway during an unwanted transient condition to change current provided to a load connected to the output of the voltage regulation circuit; and wherein the second error amplifier provides at least one of a propagation delay duration that is shorter in duration, or a bandwidth that is wider, in comparison to the first error amplifier.

In Aspect 2, the subject matter of Aspect 1 optionally includes the second error amplifier comprising a comparator, and the comparator provides a latency that is shorter than a corresponding propagation delay of the first error amplifier.

In Aspect 3, the subject matter of one or both of Aspects 1 and 2 optionally include at least one of the representation of the output voltage of the voltage regulation circuit or the representation of the reference voltage including an applied offset voltage at an input of the second error amplifier, as compared to the first error amplifier.

In Aspect 4, the subject matter of one or any combination of Aspects 1-3 optionally includes a shunt device arranged to provide a current pathway bypassing a load connected to the output of the voltage regulation circuit, and the second error amplifier output is coupled to the shunt device to suppress overshoot of the output voltage of the voltage regulation circuit by shunting current from the output of the voltage regulation circuit.

In Aspect 5, the subject matter of one or any combination of Aspects 1-4 optionally includes a shunt device arranged to provide a current pathway to boost current to a load connected to the output of the voltage regulation circuit, and the second error amplifier output is coupled to the shunt device to suppress undershoot of the output voltage of the voltage regulation circuit by boosting current to the output of the voltage regulation circuit.

In Aspect 6, the subject matter of one or any combination of Aspects 1-5 optionally includes a second error amplifier comprising a control input coupled with logic circuitry to enable the second error amplifier during startup of the voltage regulation circuit and to disable the second error amplifier after startup.

In Aspect 7, the subject matter of one or any combination of Aspects 1-6 optionally includes logic circuitry to disable one or both of the first error amplifier and the pass device when the shunt device is activated by the second error amplifier.

In Aspect 8, the subject matter of one or any combination of Aspects 1-7 optionally includes including an open-loop regulation circuit separate from a loop corresponding to the first error amplifier and a loop corresponding to the second error amplifier.

In Aspect 9, the subject matter of Aspect 8 optionally includes an open-loop regulation circuit that includes an input coupled to the reference voltage, and an output to provide a substantially constant voltage generated at least in part using the reference voltage.

In Aspect 10, the subject matter of one or both of Aspects 8 and 9 optionally includes an open-loop regulation circuit limited to supplying an output current that is substantially less than a corresponding maximum output current supplied through the pass device.

In Aspect 11, the subject matter of one or any combination of Aspects 8-10 optionally includes a selectable mode input, wherein the first error amplifier and second error amplifier are configured to be enabled or disabled in response to the mode input, and wherein the open-loop regulation circuit is configured to be selectively enabled in a mode where the first error amplifier and second error amplifier are disabled.

In Aspect 12, the subject matter of one or any combination of Aspects 8-11 optionally includes a voltage reference circuit comprising a Complementary-to-Absolute-Temperature (CTAT) topology to provide the reference voltage to the reference input, and wherein the open-loop regulation circuit includes another circuit having a CTAT temperature response.

In Aspect 13, the subject matter of one or any combination of Aspects 8-11 optionally includes an open-loop regulation circuit has a Proportional-to-Absolute-Temperature (PTAT) minus PTAT (PTAT−PTAT) circuit topology.

Aspect 14 includes subject matter (such as a voltage regulator circuit) or can optionally be combined with one or any combination of Aspects 1-13 to include such subject matter comprising a reference input to receive a reference voltage; a first error amplifier coupled to the reference input, the first error amplifier comprising an output indicative of a first difference between a representation of the reference voltage received from the reference input, and a representation of an output voltage of the voltage regulation circuit; a pass device coupled to the output of the first error amplifier, the pass device arranged to supply an output of the voltage regulation circuit; and an open-loop regulation circuit separate from a loop corresponding to the first error amplifier.

In Aspect 15, the subject matter of Aspect 14 optionally includes open-loop regulation circuit comprises an input coupled to the voltage reference, and an output to provide a substantially constant voltage generated at least in part using the voltage reference.

In Aspect 16, the subject matter of one or both of Aspects 14 and 15 optionally includes an open-loop regulation circuit limited to supplying an output current that is substantially less than a corresponding maximum output current supplied through the pass device.

In Aspect 17, the subject matter of one or both of Aspects 14-16 optionally includes a selectable mode input, wherein the first error amplifier is configured to be enabled or disabled in response to the mode input, and wherein the open-loop regulation circuit is configured to be selectively enabled in a mode where the first error amplifier is disabled.

In Aspect 18, the subject matter of one or any combination of Aspects 14-17 optionally includes a voltage reference circuit having a Complementary-to-Absolute-Temperature (CTAT) topology to provide the reference voltage, and wherein the open-loop regulation comprises another circuit having a CTAT temperature response.

Aspect 19 includes subject matter (such as a voltage regulator circuit) or can optionally be combined with one or any combination of Aspects 1-18 to include such subject matter, including a main regulator circuit loop and a secondary circuit loop. The main regulator circuit loop includes a first error amplifier including an input coupled to an output of the voltage regulation circuit, and a pass device coupled to the output of the first amplifier circuit and the output of the voltage regulation circuit, the first error amplifier to regulate an output voltage at the output of the voltage regulation circuit. The secondary circuit loop includes a second error amplifier having higher gain than the first error amplifier circuit and including an input operatively coupled to the output of the voltage regulation circuit; a shunt device having a shunt input coupled to the pass device and a control input coupled to the output of the second error amplifier; and wherein second error amplifier activates the shunt device to bypass a load at the output of the regulation circuit when the output voltage overshoots a target output voltage.

In Aspect 20, the subject matter of Aspect 19 includes an open-loop regulation circuit, separate from the main regulator circuit loop and the secondary circuit loop, and configured to regulate the output voltage; and a mode control switching circuit configured to enable regulation of the output voltage by the open-loop regulation circuit when the load current is less than a specified threshold load current.

In Aspect 21, the subject matter of one or both of Aspects 19 and 20 optionally includes open loop feedback circuit that includes a Complementary-to-Absolute-Temperature (CTAT) voltage reference and a low power sub-regulator device having a CTAT temperature response.

The non-limiting Aspects can be combined in any permutation or combination. Each of the non-limiting aspects described in this document can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a claim are still deemed to fall within the scope of that claim. Moreover, in the following aspects, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A voltage regulator circuit, comprising:

a reference input to receive a reference voltage;

a first error amplifier coupled to the reference input, the first error amplifier comprising an output indicative of a first difference between a representation of the reference voltage received from the reference input, and a representation of an output voltage of the voltage regulation circuit;

a pass device coupled to the output of the first error amplifier, the pass device arranged to supply an output of the voltage regulation circuit;

a second error amplifier coupled to the reference input, the second error amplifier comprising an output indicative of another difference between a representation of the reference voltage received from the reference input, and another representation of the output voltage of the voltage regulation circuit;

a shunt device coupled to the output of the second error amplifier, the shunt device arranged to provide a temporary current pathway during an unwanted transient condition to change current provided to a load connected to the output of the voltage regulation circuit; and wherein the second error amplifier provides at least one of a propagation delay duration that is shorter in duration, or a bandwidth that is wider, in comparison to the first error amplifier.

2. The voltage regulator circuit of claim 1, wherein the second error amplifier includes a comparator; and wherein the comparator provides a latency that is shorter than a corresponding propagation delay of the first error amplifier.

3. The voltage regulator circuit of claim 1, wherein at least one of the representation of the output voltage of the voltage regulation circuit or the representation of the reference voltage includes an applied offset voltage at an input of the second error amplifier, as compared to the first error amplifier.

4. The voltage regulator circuit of claim 1, wherein the shunt device is arranged to provide a current pathway bypassing a load connected to the output of the voltage regulation circuit, and the second error amplifier output is coupled to the shunt device to suppress overshoot of the output voltage of the voltage regulation circuit by shunting current from the output of the voltage regulation circuit.

5. The voltage regulator circuit of claim 1, wherein the shunt device is arranged to provide a current pathway to boost current to a load connected to the output of the voltage regulation circuit, and the second error amplifier output is coupled to the shunt device to suppress undershoot of the output voltage of the voltage regulation circuit by boosting current to the output of the voltage regulation circuit.

6. The voltage regulator circuit of claim 1, wherein the second error amplifier includes a control input coupled with logic circuitry to enable the second error amplifier during startup of the voltage regulation circuit and to disable the second error amplifier after startup.

7. The voltage regulator circuit of claim 1, including logic circuitry to disable one or both of the first error amplifier and the pass device when the shunt device is activated by the second error amplifier.

8. The voltage regulator circuit of claim 1, including an open-loop regulation circuit separate from a loop corresponding to the first error amplifier and a loop corresponding to the second error amplifier.

9. The voltage regulator circuit of claim 8, wherein the open-loop regulation circuit includes an input coupled to the reference voltage, and an output to provide a substantially constant voltage generated at least in part using the reference voltage.

10. The voltage regulator circuit of claim 8, wherein the open-loop regulation circuit is limited to supplying an output current that is substantially less than a corresponding maximum output current supplied through the pass device.

11. The voltage regulator circuit of claim 8, including a selectable mode input, wherein the first error amplifier and second error amplifier are configured to be enabled or disabled in response to the mode input, and wherein the open-loop regulation circuit is configured to be selectively enabled in a mode where the first error amplifier and second error amplifier are disabled.

12. The voltage regulator circuit of claim 8, including a voltage reference circuit comprising a Complementary-to-Absolute-Temperature (CTAT) topology to provide the reference voltage to the reference input; and wherein the open-loop regulation circuit includes another circuit having a CTAT temperature response.

13. The voltage regulator circuit of claim 8, wherein the open-loop regulation circuit has a Proportional-to-Absolute-Temperature (PTAT) minus PTAT (PTAT−PTAT) circuit topology.

14. A voltage regulator circuit, comprising:

a reference input to receive a reference voltage;

a first error amplifier coupled to the reference input, the first error amplifier comprising an output indicative of a first difference between a representation of the reference voltage received from the reference input, and a representation of an output voltage of the voltage regulation circuit;

a pass device coupled to the output of the first error amplifier, the pass device arranged to supply an output of the voltage regulation circuit; and an open-loop regulation circuit separate from a loop corresponding to the first error amplifier.

15. The voltage regulator circuit of claim 14, wherein the open-loop regulation circuit includes an input coupled to the voltage reference, and an output to provide a substantially constant voltage generated at least in part using the voltage reference.

16. The voltage regulator circuit of claim 14, wherein the open-loop regulation circuit is limited to supplying an output current that is substantially less than a corresponding maximum output current supplied through the pass device.

17. The voltage regulator circuit of claim 14, including a selectable mode input, wherein the first error amplifier is configured to be enabled or disabled in response to the mode input, and wherein the open-loop regulation circuit is configured to be selectively enabled in a mode where the first error amplifier is disabled.

18. The voltage regulator circuit of claim 14, including:

a voltage reference circuit having a Complementary-to-Absolute-Temperature (CTAT) topology to provide the reference voltage; and wherein the open-loop regulation circuit includes another circuit having a CTAT temperature response.

19. A voltage regulator circuit comprising:

a main regulator circuit loop including:

a first error amplifier including an input coupled to an output of the voltage regulation circuit; and a pass device coupled to the output of the first amplifier circuit and the output of the voltage regulation circuit, the first error amplifier to regulate an output voltage at the output of the voltage regulation circuit; and a secondary circuit loop including:

a second error amplifier having higher gain than the first error amplifier circuit and including an input operatively coupled to the output of the voltage regulation circuit;

a shunt device having a shunt input coupled to the pass device and a control input coupled to the output of the second error amplifier; and wherein second error amplifier activates the shunt device to bypass a load at the output of the regulation circuit when the output voltage overshoots a target output voltage.

20. The voltage regulator circuit of claim 19, including:

an open-loop regulation circuit separate from the main regulator circuit loop and the secondary circuit loop, and configured to regulate the output voltage; and a mode control switching circuit configured to enable regulation of the output voltage by the open-loop regulation circuit when the load current is less than a specified threshold load current.

21. The voltage regulator circuit of claim 19, wherein the open loop feedback circuit includes a Complementary-to-Absolute-Temperature (CTAT) voltage reference and a low power sub-regulator device having a CTAT temperature response.

* * * * *